Oct. 20, 1942.  G. T. DOWNEY  2,299,615
VALVE ASSEMBLY
Filed May 6, 1942  7 Sheets-Sheet 1

Inventor
G. T. Downey
By Kimmel & Crowell
Attorneys

Oct. 20, 1942.   G. T. DOWNEY   2,299,615
VALVE ASSEMBLY
Filed May 6, 1942   7 Sheets-Sheet 3

Inventor
G. T. Downey
By Kimmel & Crowell
Attorneys

Oct. 20, 1942.　　　G. T. DOWNEY　　　2,299,615
VALVE ASSEMBLY
Filed May 6, 1942　　　7 Sheets-Sheet 4

Inventor
G. T. Downey
By Kimmel & Crowell
Attorneys

Oct. 20, 1942. G. T. DOWNEY 2,299,615
VALVE ASSEMBLY
Filed May 6, 1942 7 Sheets-Sheet 7

Inventor
G. T. Downey
By Kimmel & Crowell
Attorneys

Patented Oct. 20, 1942

2,299,615

UNITED STATES PATENT OFFICE 2,299,615

VALVE ASSEMBLY

George T. Downey, Corry, Pa., assignor to Aero Supply Mfg. Co., Inc., Corry, Pa.

Application May 6, 1942, Serial No. 441,941

12 Claims. (Cl. 277—20)

This invention relates to fluid regulating valves.

An object of this invention is to provide a valve assembly including a housing provided with a plurality of radially arranged intake ports and a common outlet port, with a rockable valve for each intake port and a common cam operator for all of the valves so that a selected valve may be rocked to an open position.

Another object of this invention is to provide an improved rockable valve structure and an improved sealing means for the structure so that a valve of this type may be used for regulating the flow of gasoline to an engine, which has heretofore been impossible with a valve of this type.

Another object of this invention is to provide an improved means for mounting a rockable valve in the housing so as to permit the ready removal of the valve structure without complete disassembly of the valve assembly.

A further object of this invention is to provide an improved operator for the rockable valve which is coupled to the valve cage or seat in such a manner as to be removable from the housing with the cage.

A further object of this invention is to provide a valve structure which is so constructed as to admit the assembly of the structure under line-production methods.

A further object of this invention is to provide a valve assembly of the kind provided with a plurality of radially arranged valve structures in which a selected valve structure may be moved to open position, or selected pairs or all of the valve structures may be moved to open position at one time.

To the foregoing objects and to others which may hereinafter appear the invention consists of the novel construction, combination and arrangement of parts as will be more specifically referred to and illustrated in the accompanying drawings, wherein are shown embodiments of the invention, but it is to be understood that changes, variations and modifications may be resorted to which fall within the scope of the invention as claimed.

Referring to the drawings and first to Figures 1 to 13, inclusive, the numeral 25 designates generally a valve housing which is formed of a cylindrical body 26 having secured to the opposite ends thereof heads or end walls, generally designated as 27 and 28. The head 27 is formed with a central body 29 provided with a threaded outlet port 30 in the axial center thereof which communicates with the interior of the cylindrical body or side wall 26. The body 29 is formed with an inwardly extending annular flange 31 which engages interiorly of the cylindrical side wall 26, and the head 27 is also formed with an annular outer flange 32 which is of a diameter substantially greater than the diameter of the side wall 26. The cylindrical side wall 26 is formed with an annular groove 33 within which a ring-shaped sealing gasket 34 is adapted to engage and the gasket 34 contacts with the head 27 at substantially the junction between the two flanges 31 and 32.

Figures 2, 3, 4:
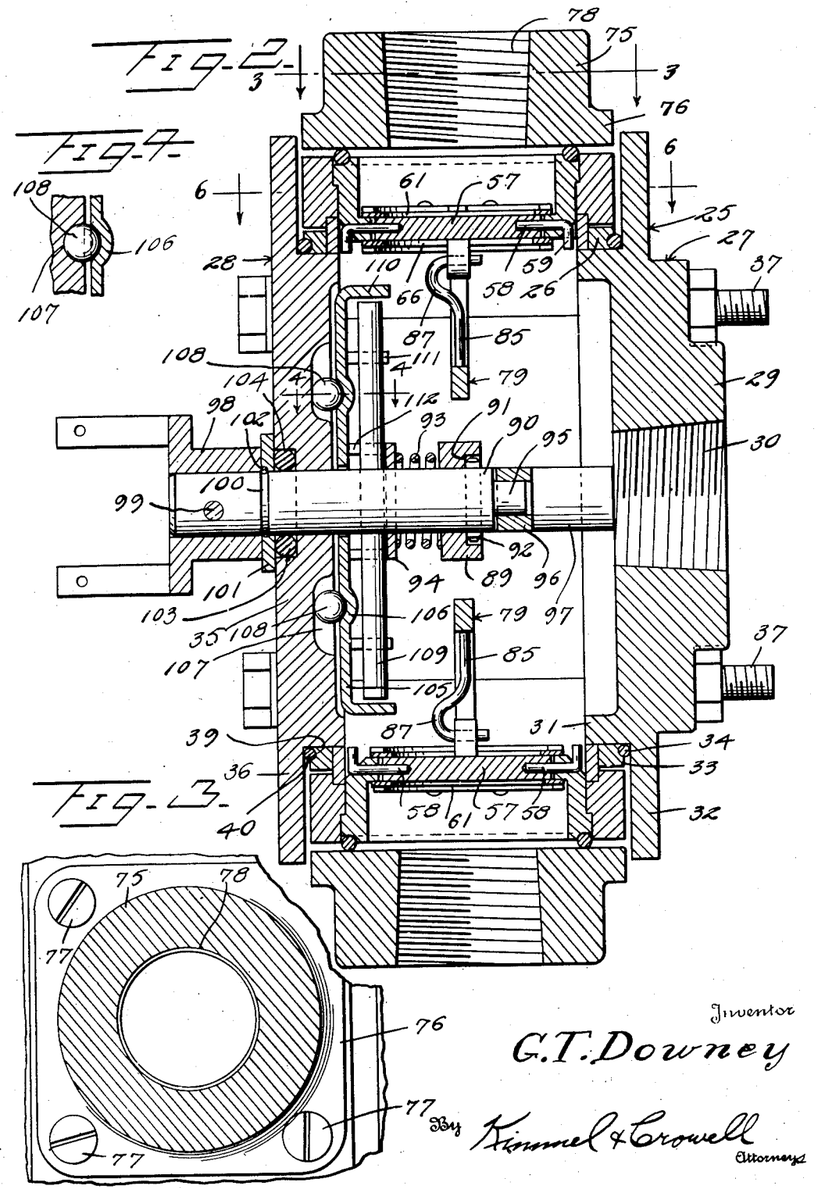
Figure 2 is a sectional view taken on the line 2—2 of Figure 1.
Figure 3 is a fragmentary sectional view taken on the line 3—3 of Figure 2.
Figure 4 is a fragmentary sectional view taken on the line 4—4 of Figure 2.
Figure 5:
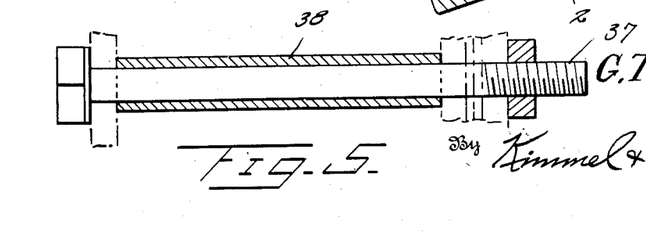
Figure 5 is a fragmentary sectional view showing the bolts for securing the valve housing together.

The head 28 constitutes the front wall of the housing and is formed with a central body 35 which is adapted to extend interiorly of the side wall 26, as shown in Figure 2. The body 35 is formed with an integral flange 36 which is of a diameter equal to the flange 32, and a plurality of bolts 37 are extended through the flanges 32 and 36 so as to hold the heads 27 and 28 against the opposite ends of the side wall structure 26. Preferably, a cylindrical spacer 38 is interposed between the flanges 32 and 33 so that tightening of the bolt 37 will not place an undue strain upon the flanges 32 and 36. The side wall 26 is provided at its front end with an annular groove or seat 39 within which a ring-shaped sealing gasket 40 is adapted to engage. Tightening of the bolts 37 will compress the sealing gaskets 34 and 40 so that the heads 27 and 28 will be tightly sealed against the opposite ends of the side wall 26.

The valve housing structure or assembly 25 includes a plurality of radially arranged valve structures, generally designated as 41, 42, 43 and 44. These valve structures 41 to 44, inclusive, are of identical construction and the detailed description of one of these valve structures will apply equally as well to the other valve structures. The valve structure 41 includes a cylindrical sleeve 45 which is firmly secured in an opening 46 formed in the side wall 26. A removable sleeve or housing 47 engages about the projecting portion of the sleeve 45 and a gasket 48 is interposed between the inner end of the housing or sleeve 47 and the outer side of the cylindrical side wall 26. The sleeve 47 is formed with an inwardly projecting flange 49 which is adapted to abut against the outer end of the sleeve 45 as shown in Figure 1.

Figure 7:
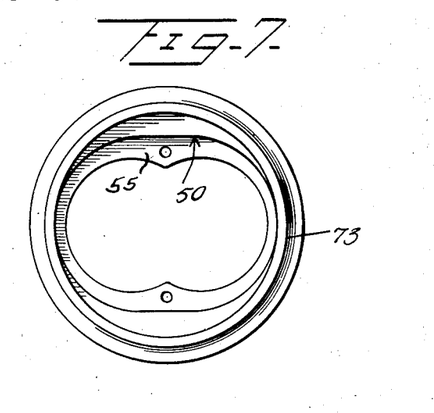
Figure 7 is a detail top plan of one of the valve cages.
Figure 8:
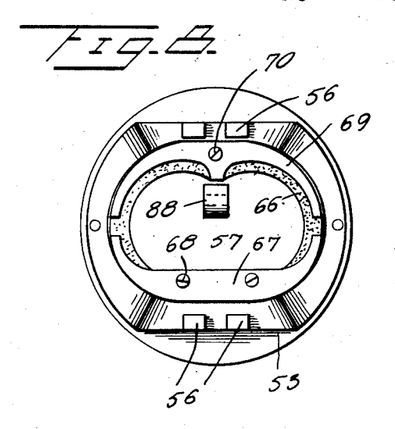
Figure 8 is a bottom plan of the valve cage with a valve mounted therein.
Figure 9:
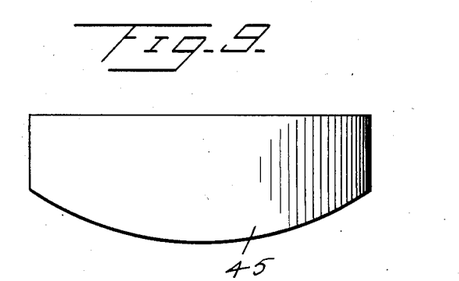
Figure 9 is a detail side elevation of one of the cylindrical bosses mounted in the valve housing.
Figure 10:
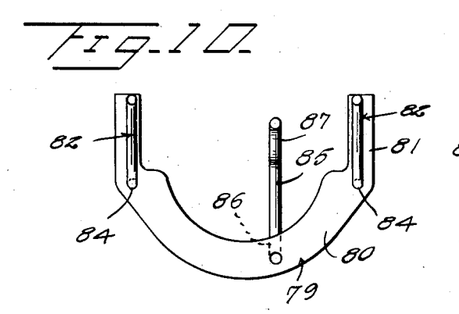
Figure 10 is a detail side elevation of one of the valve operating yokes.
Figure 11:
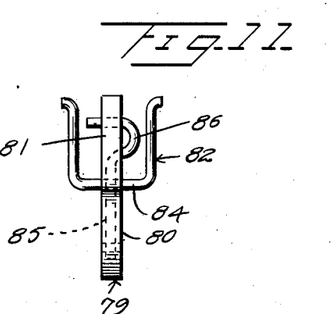
Figure 11 is a detail end elevation of one of the valve yokes.
Figure 12:
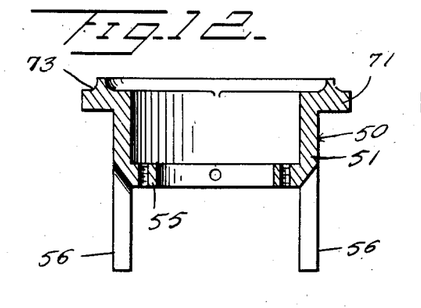
Figure 12 is a vertical section of one of the valve cages with the valve structure removed therefrom.
Figure 13:
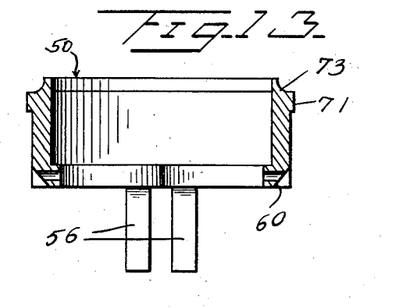
Figure 13 is a vertical section similar to Figure 12, but taken at right angles thereto.

A removable valve cage 50 is mounted within the housing or sleeve 47 and comprises a tubular body 51 which is formed with parti-circular opposed portions 52 which are snugly engageable within the sleeve 45 and within the sleeve 47. The body 51 is also formed with opposed flat portions 53 which form opposed chambers 54 between the flat portions 53 and the inner side of the sleeve 45 and the sleeve 49. The cage 50 is provided with a valve seat 55 which has the configuration of a figure eight as shown in Figure 7. The cage 50 is also provided with diametrically opposed pairs of inwardly projecting guide members 56, the purpose for which will be hereinafter described.

A rockable valve plate or member 57 is pivotally mounted on diametrically opposed trunnions or pins 58 which are extended through the inner end portions of the body 51 and the pins or trunnions 58 are provided with right angular inwardly projecting extensions 59 which are adapted to substantially abut against the inner surface of the sleeve 45. The body 51 is formed with beveled outer portions 60 which provide a space through which the extensions 59 are adapted to extend as shown in Figure 2. The valve member 57 has fixed to the outer side thereof a sealing gasket 61 which is secured to the outer side of the valve member 57 by means of an arcuate plate 62. The plate 62 is secured to the valve member 57 by fastening members 63. The gasket 61 is also secured to the outer side of the valve seat 55 by means of a holding or clamping plate 64 which is secured to the valve seat 55 by means of one or more fastening members 65.

Figure 1:
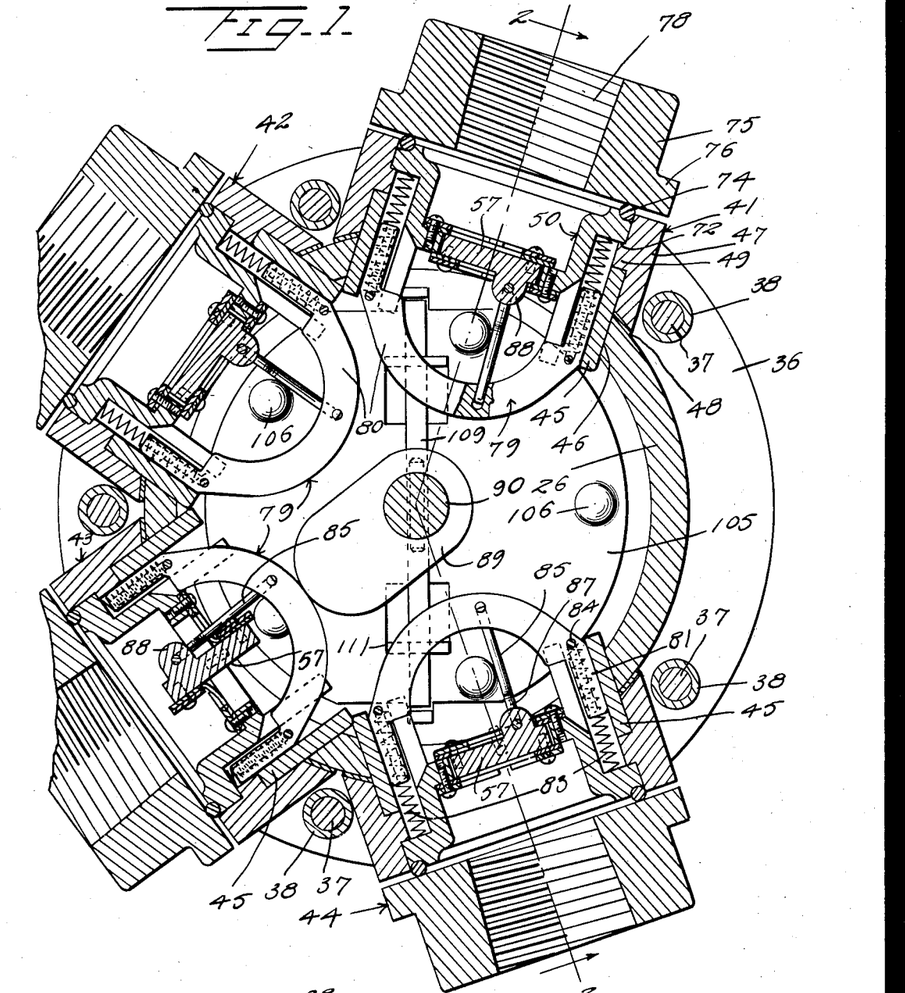
Figure 1 is a transverse sectional view partly broken away of a valve assembly constructed according to an embodiment of this invention.
Figure 6:
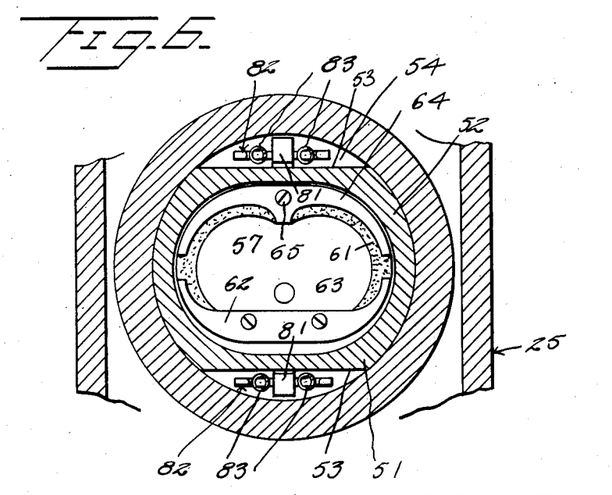
Figure 6 is a sectional view taken on the line 6—6 of Figure 2.

The plates 62 and 64 have their confronting ends disposed in spaced apart relation as shown in Figure 6, so that the valve member 57 may be rocked on the pivot members 58 and when the valve member 57 is rocked, the gasket 61 will be flexed as shown in Figure 1, with respect to the valve structure 43. In other words, the gasket 61 has substantially one-half thereof secured to the valve member 57 and substantially the remaining portion thereof is secured to the outer side of the valve seat 55.

The valve member 57 also has secured to the inner side thereof a second gasket 66. The gasket 66 is secured for a portion of the area thereof to the inner side of the valve member 57 by means of a clamping plate 67 which is secured by fastening members 68 to the inner side of the valve member 57. The gasket 66 is also secured by means of a clamping plate 69 to the inner side of the valve seat 55, the clamping plate 69 being secured to the valve seat 55 by one or more fastening members 70. The valve cage 51 at its outer portion is provided with an outwardly extending flange 71 which is of annular construction and which is adapted to rest on the shoulder 72 which is formed by the flange 49. The flange 71 is provided with an annular groove 73 in its outer end portion within which a ring-shaped sealing member 74 is adapted to engage. A boss 75 which is formed with a flange 76 is adapted to be secured to the sleeve or housing 47 by means of fastening members 77 which when tightened will compress the gasket 74 between the inner end of the boss 75 and the outer portion of the cage member 50. The boss 75 is formed with a threaded outlet opening or port 78 with which a fluid conducting member is adapted to be connected for conducting the fluid from the interior of the housing 25 to the desired location.

A substantially U-shaped yoke or valve operating member 79 is slidably disposed between the opposed pairs of guide members 56, and the yoke or valve operating member 79 comprises an arcuate inner member 80 which has formed integral with the outer end portions thereof a pair of parallel slide members 81. The slide members 81 are adapted to engage in the chambers 54 and the outer end portions of the arcuate operating member 80 slidably engage between the pairs of guide members 56. The operating member 79 has secured to the opposite end portions of the arcuate part 80 thereof, U-shaped spring retaining members 82 and a pair of springs 83 engage between the extensions 81 and the legs of the retainers 82. The inner end portions of the springs 83 rest on the bight 84 of the retainer 82 and the outer end portions of the springs 83 bear against the flange 71.

The springs 83 constantly urge the valve member 57 to a closed position. The valve member 57 is connected with the operator 79 by means of a connecting bar or link 85 which has the inner end thereof secured as at 86 within the arcuate part 80. The connecting member 85 is formed with a hook 87 at its outer end portion which is rockably mounted in an inwardly projecting lug 88 formed on the inner side of the valve member 57 at one side of the pivot members 58.

The valve member 57 is selectively moved to an open position by means of a cam 89 which is mounted on a cam shaft 90. The cam 89 is secured on the cam shaft 90 by providing a slot 91 in the inner side thereof, and a pin 92 is extended through the shaft 90 and has the outer or projecting end portions thereof seated in the slot 91. The cam 89 is yieldably held in locked position with respect to the shaft 90 by means of a spring 93 which at one end bears against the outer side of the cam 89. The opposite end of the spring 93 bears against a cup-shaped member 94 which is carried by the shaft 90. The shaft 90 is provided with a reduced inner end portion 95 which is rotatably mounted in a diametrically disposed bearing bar 96 which is secured by means of outwardly extending arms 97 to the head 27. The shaft 90 at its outer end portion has secured thereto a handle coupling member 98 which is secured to the outer portion of the shaft 90 by means of a fastening member 99. The shaft 90 is formed with an annular groove 100 adjacent the inner end portion of the coupling member 98 and an annular plate 101 is interposed between the inner end of the coupling member 98 and the outer side of the head 28. A lock ring 102 is mounted in the groove 100 and a sealing member 103 is mounted in an annular channel 104 which is formed in the outer side of the head 28. The plate 101 bears against the sealing member 103 so that outward strain or tension applied to the shaft 90 by means of the spring 93 will cause the plate 101 to compress the gasket 103.

In order to provide a means whereby the shaft 90 may be yieldably retained in a selected position with respect to a selected valve structure, I have provided an index plate 105 which is loosely mounted on the shaft 90 on the inner side of the head 28. The plate 105 is formed with a plurality of radially arranged inwardly projecting detents 106, and the head 28 on the inner side thereof is formed with a plurality of radially arranged ball sockets 107 within which balls 108 are adapted to engage. The balls 108 engage not only in the sockets 107 but also in the concave side of each detent 106 as shown in Figure 2.

The cup-shaped member 94 at its outer end bears against the inner side of the plate 105 so as to place the plate 105 under the desired tension. The plate 105 is held against rotation with respect to the shaft 90 by means of an elongated pin 109 which extends through the shaft 90. The outer portions of the plate 105 are provided with right angularly disposed lugs 110 which confront the opposite end portions of the locking pin 109 so as to thereby hold the pin 109 against endwise movement. The plate 105 has struck inwardly therefrom pairs of inwardly projecting lugs 111 which engage on opposite sides of the pin 109 so that the plate 105 will be held against rotation with respect to the shaft 90.

The cup-shaped member 94 is also formed with diametrically opposed slots 112 in the outer portion thereof within which the pin 109 is also adapted to engage as shown in Figure 2.

Referring now to Figures 14 to 21, inclusive, the numeral 25a designates generally a valve housing structure which is somewhat similar to that shown in Figures 1 and 2. The housing structure 25a includes a cylindrical side wall member 26a which has secured to the opposite ends thereof heads or end plates 27a and 28a. The heads 27a and 28a are secured to the opposite ends of the cylindrical side wall 26a by means of a plurality of bolts 37a which have spacing sleeves similar to 38 mounted thereabout between the flanges 32a and 36a formed integral with the heads 27a and 28a respectively.

Figure 14:
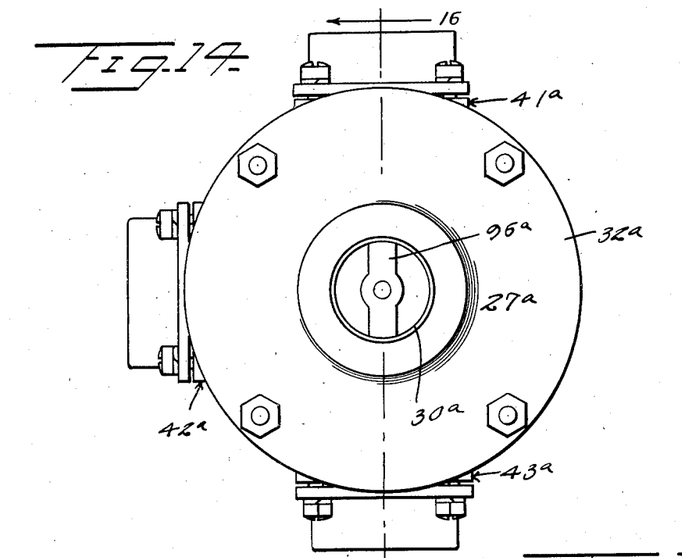
Figure 14 is a detail rear elevation of a modified form of this valve structure.
Figure 15:
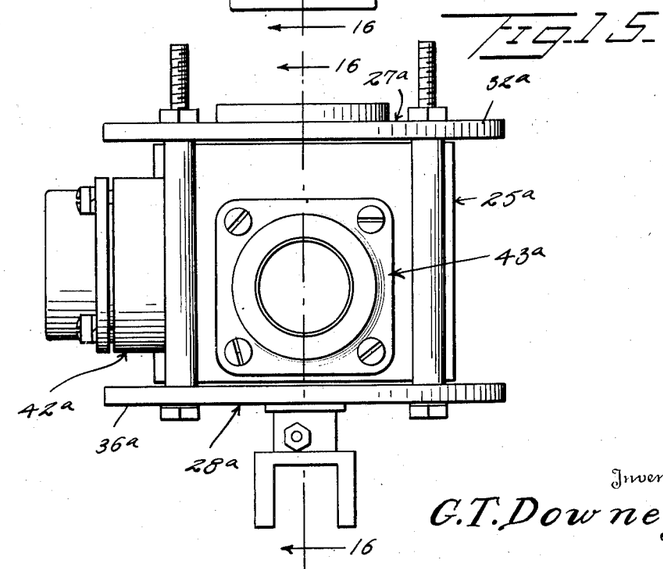
Figure 15 is a detail top plan of the valve assembly structure shown in Figure 14.
Figures 16, 21:
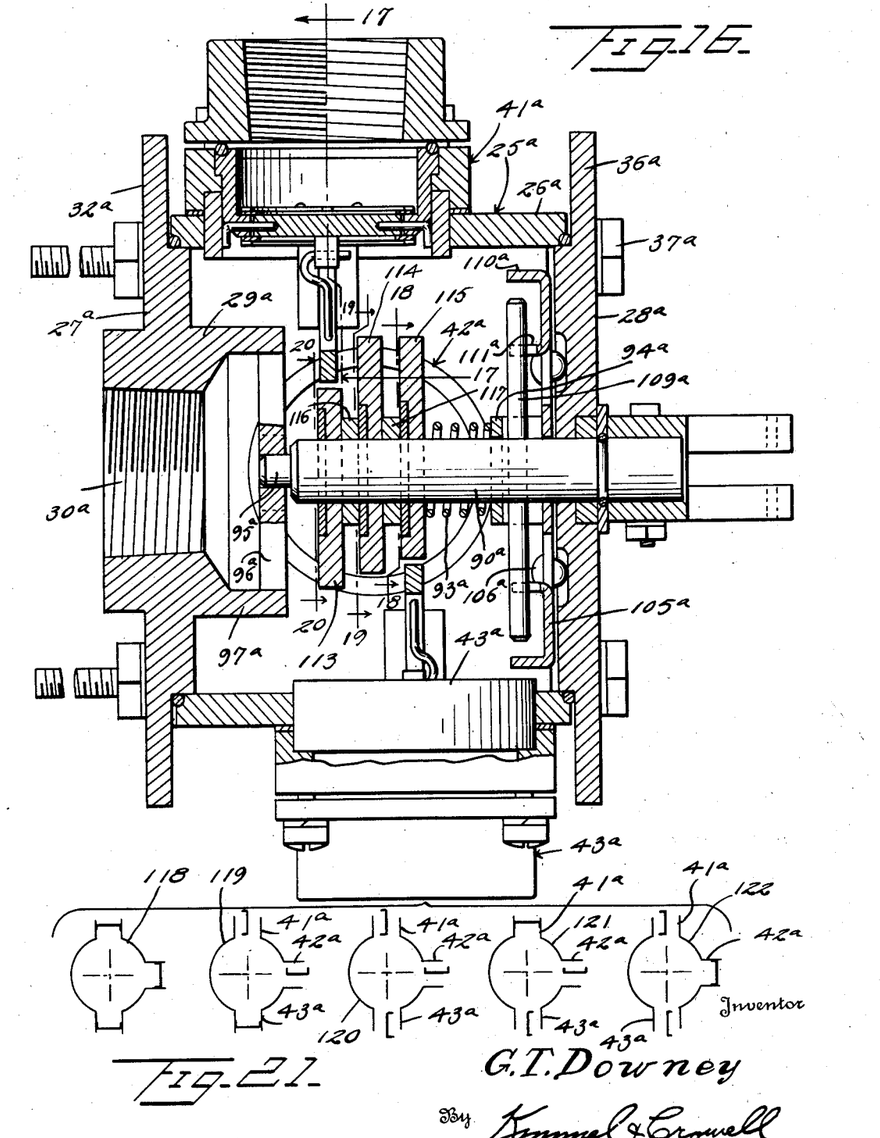
Figure 16 is a sectional view taken on the line 16—16 of either Figure 14 or 15.
Figure 21 is a diagrammatic view showing the various valve positions.
Figure 17:
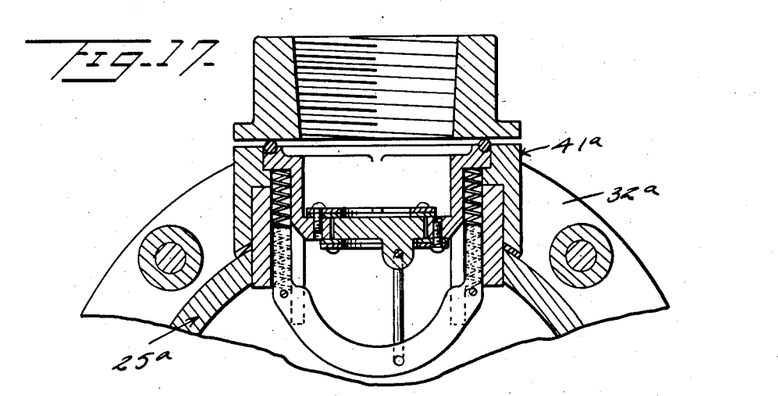
Figure 17 is a sectional view taken on the line 17—17 of Figure 16.
Figure 18:
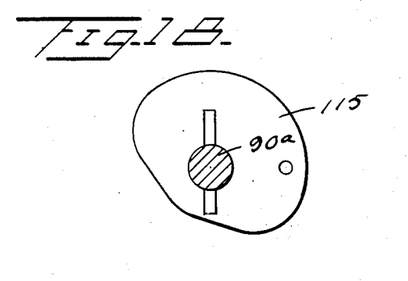
Figure 18 is a sectional view taken on the line 18—18 of Figure 16.
Figure 19:
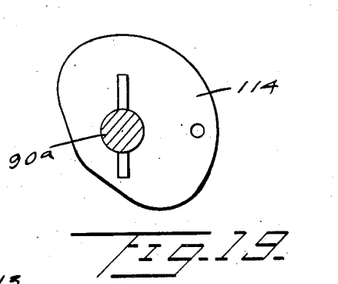
Figure 19 is a sectional view taken on the line 19—19 of Figure 16.
Figure 20:
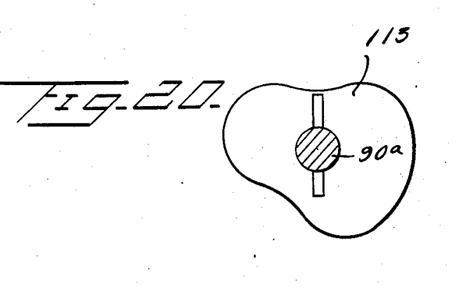
Figure 20 is a sectional view taken on the line 20—20 of Figure 16.

The side wall 26a has secured thereto a plurality of radially arranged and longitudinally offset valve structures 41a, 42a and 43a. The valve structures 41a, 42a and 43a are of like construction and are similar in every detail to the valve structure 41, hereinbefore described. It is, therefore, believed unnecessary to go into the detailed description of the valve structures 41a, 42a and 43a. A cam shaft 90a is journaled through the head 28a and is provided with a reduced inner end portion 95a which is rotatably mounted in a diametrically disposed bearing bar 96a which is carried by inwardly projecting extensions 97a formed integral with an outlet boss 29a carried by the head 27a. The boss 29a is formed with an outlet port 30a through which the fluid is adapted to pass which enters the interior of the housing 25a.

The shaft 90a has fixed thereon within the housing 25a a plurality of valve operating cams 113, 114 and 115. The cam 113 is shown in detail in Figure 20 and the cams 114 and 115 are shown in detail or side elevation in Figures 18 and 19, respectively. The cams 113 and 114 are held in spaced relation by means of a spacer ring 116 which is mounted on the shaft 90a and the cams 114 and 115 are held in spaced apart relation by means of a spacer ring 117. A spring 93a bears against the cam 115 and constantly maintains the several cams in contacting relation. The cams 113, 114 and 115 are held against rotation with respect to the shaft 90a in the same manner as the cam 89 is held against rotation with respect to the shaft 90. The spring 93a at its outer end bears against a cup-shaped member 94a and an index plate 105a is interposed between the inner side of the head 28a and the outer end of the member 94a. The index plate 105a is held against rotation with respect to the shaft 90a by means of a pin 109a which is extended through the shaft 90a and which engages between the pairs of inwardly projecting lugs 111a which are struck inwardly from the index plate 105a.

The pin 109a is held against endwise movement by a pair of inwardly projecting lugs 110a formed integral with the plate 105a. The plate 105a is also formed with a plurality of circumferentially arranged inwardly projecting detents 106a, and retaining balls similar to the balls 108 engage in the detents 106a and also engage in sockets provided in the inner side of the head 28a similar to the sockets 107.

In Figure 21 there is disclosed diagrammatically the manner in which the valve structure hereinbefore described is adapted to operate. As shown at 118 all of the valve members are in a closed position. In one position of the cam shaft 90a, as shown at 119, the two valve structures 41a and 42a are in open position, whereas the valve structure 43a is in a closed position. In another position of the cam shaft 90a, the three valve structures 41a, 42a and 43a are all in an open position as indicated at 120. In a further position of the cam shaft 90a as shown at 121, the valve structure 41a is closed, whereas the valve structures 42a and 43a are in open position. In a further position of the cam shaft 90a as shown at 122, the valve structure 41a is open, the valve structure 42a is closed and the valve structure 43a is open.

It will be apparent from the foregoing that any selected pair of the valve structures 41a, 42a and 43a may be moved to an open position or all of these valve structures may be moved to either open or closed position.

Referring now to Figures 1 and 2, the valve assembly herein disclosed operates as follows: Rotation of the cam shaft 90 to a selected position will move one of the valve structures to an open position. As an example, the valve structure 43 is shown as being in open position, whereas the valve structures 41, 42 and 44 are in closed position. When the cam member 89 engages the arcuate operator 79, this operator is pushed outwardly against the tension of the springs 83. Outward movement of the operator 79 will effect rocking of the valve member 57 to a position substantially aligning with the longitudinal axis of the valve structure. As the gaskets 61 and 66 are of narrow construction, being open in the inner portion thereof when the valve member 57 is rocked to an open position, the fluid may flow from the intake port 78 through the interior of the gaskets 61 and 66 and into the interior of the cylindrical side wall 26 and then out through the outlet port 30.

The valve structure hereinbefore described is so constructed that it may be formed on an assembly line in the following manner: The side wall 26 may initially have the sleeve 45 pressed therethrough and where these sleeves are of sufficient number as shown in Figure 1, the inner ends of adjacent sleeves will abut against each other. The valve structure 41 may be assembled as a separate unit and in like manner the head 28 may have the cam shaft 90 mounted therein with the cam 89 and the remaining parts which are disposed about the shaft 90 on the inner side of the head 28. In the final assembly the heads 27 and 28 are secured to the opposite ends of the side wall 26 by the fastening bolts 37. It will be apparent from the foregoing that any machine operations may be performed on the individual parts making up the valve assembly, and then the several units may be assembled independently of each other and finally combined as hereinbefore described.

What I claim is:

1. A multiple valve assembly comprising a housing formed with a common intake port and a plurality of outlet ports, a valve seat for each intake port, a pivoted valve member for each seat, a sealing gasket, means securing a portion of each gasket to a seat, means securing the remaining portion of each gasket to said valve member, a movable valve operator for each valve member, yieldable means constantly urging said operator to maintain said valve member in closed position, and cam means rotatably carried by said housing engageable with a selected operator for moving said selected operator to valve member opening position.

2. In a multiple valve assembly, a valve structure comprising a tubular cage, opposed pairs of inwardly projecting guides carried by said cage, a valve seat carried by said cage, a valve member, means pivotally mounting said valve member in said cage whereby said valve member when in closed position will be disposed coplanar with said seat and interiorly thereof, a sealing gasket, means securing a portion of said gasket to one side of said seat, means securing another portion of said gasket to one side of said valve member, an operator for said valve member slidably engaging said guides, and means connecting said operator with said valve member.

3. In a multiple valve assembly, a valve structure comprising a tubular cage formed with opposed flat sides, an outer annular flange carried by said cage, opposed pairs of inwardly projecting guides carried by the inner end of said cage, a valve seat integral with the inner portion of said cage, a valve member, means pivotally mounting said valve member in said cage whereby said valve member when in closed position will be disposed coplanar with said seat and interiorly thereof, a sealing gasket disposed in overlapping position with respect to said seat and the outer portions of said valve member, means securing a portion of said gasket to said seat, means securing another portion of said gasket to said valve member, an operator for said valve member slidably engaging said guides, yieldable means confronting said flat sides bearing against said outer flange and against said operator to thereby bias said operator to valve member closing position, and means connecting said operator with said valve member.

4. In a multiple valve assembly, a valve structure comprising a tubular cage formed with opposed flat sides, an outer annular flange carried by said cage, opposed pairs of inwardly projecting guides carried by the inner end of said cage, a valve seat integral with the inner portion of said cage, a valve member, means pivotally mounting said valve member in said cage whereby said valve member when in closed position will be disposed coplanar with said seat and interiorly thereof, a sealing gasket disposed in overlapping position with respect to said seat and the outer portions of said valve member, means securing a portion of said gasket to said seat, means securing another portion of said gasket to said valve member, an operator for said valve member slidably engaging said guides, a pair of U-shaped spring retainers carried by said operator, springs engaging said retainers and said outer flange normally urging said operator to valve member closing position, and means connecting said operator with said valve member.

5. In a multiple valve assembly, a valve structure comprising a tubular cage formed with opposed flat sides, an outer annular flange carried by said cage, opposed pairs of inwardly projecting guides carried by the inner end of said cage, a valve seat integral with the inner portion of said cage, a valve member, means pivotally mounting said valve member in said cage whereby said valve member when in closed position will be disposed coplanar with said seat and interiorly thereof, a sealing gasket disposed in overlapping position with respect to said seat and the outer portions of said valve member, means securing a portion of said gasket to said seat, means securing another portion of said gasket to said valve member, an operator for said valve member slidably engaging said guides, said operator being U-shaped in side elevation and having the parallel legs thereof movable in confronting position with respect to said flat sides, a pair of U-shaped spring retainers carried by said operator each having the parallel legs thereof disposed in parallel relation to a leg of said operator, a pair of springs carried by each retainer, the inner ends of said springs seating on the bight of said retainer and the outer ends of said springs bearing against said outer flange, said springs normally urging said operator to valve member closing position, and means connecting said operator with said valve member.

6. In a multiple valve assembly, a valve housing including a body, opposite head members, means securing said head members to said body, radially arranged valve structures carried by said body, a cam shaft journaled through one of said head members, an inner bearing for said shaft carried by the other head member, a cam on said shaft formed with a slot in one face thereof, a locking pin extending through said shaft and seated in said slot to thereby hold said cam against rotation with respect to said shaft, and yieldable means about said shaft bearing against said cam to hold the latter interlocked with said shaft.

7. In a multiple valve assembly, a valve housing including a body, opposite head members, means securing said head members to said body, radially arranged valve structures carried by said body, a cam shaft journaled through one of said head members, an inner bearing for said shaft carried by the other head member, a cam on said shaft formed with a slot in one face thereof, a locking pin extending through said shaft and seated in said slot to thereby hold said cam against rotation with respect to said shaft, an index plate on said shaft confronting one of said heads, confronting ball sockets carried by said one head and said index plate, balls in said confronting sockets, means holding said plate against rotation with respect to said shaft, and yieldable means about said shaft between said plate and said cam for normally urging said plate toward said one head and also urging said cam against said pin.

8. A multiple valve assembly comprising a cylindrical body formed with a plurality of radially arranged openings, cylindrical sleeves tightly fitting in said openings and projecting interiorly and exteriorly of said body, outer sleeves tightly fitting about the outer portions of said first sleeves, an inner shoulder carried by each outer sleeve, a valve cage seated on said shoulder, a rockable valve member for each cage, a valve member operator slidably carried by each cage, means connecting said operator to said valve member, a pair of heads engaging the opposite ends of said body, each head including a flange having a diameter greater than the outer diameter of said body, bolts engaging through said flanges outwardly of said body for holding said heads against the ends of said body, a cam shaft journaled through one of said heads, a reduced inner end carried by said shaft, an inner bearing carried by the other head for said reduced inner end of said cam shaft, and a cam fixed on said shaft for engagement with a selected operator to thereby move a selected valve member to open position.

9. A multiple valve assembly comprising a cylindrical body formed with a plurality of radially arranged openings, cylindrical sleeves tightly fitting in said openings and projecting interiorly and exteriorly of said body, outer sleeves tightly fitting about the outer portions of said first sleeves, an inner shoulder carried by each outer sleeve, a valve cage seated on said shoulder, a valve seat carried by said cage, a rockable valve member for said seat, flexible sealing means, means securing a portion of said sealing means to said valve seat, means securing another portion of said sealing means to said valve member, a valve member operator slidably carried by each cage, means connecting said operator to said valve member, a pair of heads engaging the opposite ends of said body, each head including a flange having a diameter greater than the outer diameter of said body, bolts engaging through said flanges outwardly of said body for holding said heads against the ends of said body, a cam shaft journaled through one of said heads, a reduced inner end carried by said shaft, an inner bearing carried by the other head for said reduced inner end of said cam shaft, and a cam fixed on said shaft for engagement with a selected operator to thereby move a selected valve member to open position.

10. A multiple valve assembly comprising a cylindrical body formed with a plurality of radially arranged openings, cylindrical sleeves tightly fitting in said openings and projecting interiorly and exteriorly of said body, outer sleeves tightly fitting about the outer portions of said first sleeves, an inner shoulder carried by each outer sleeve, a valve cage seated on said shoulder, a valve seat carried by said cage, a rockable valve member carried by said cage and disposed coplanar with said seat when in closed position, flexible sealing members engaging the opposite sides of said seat and said valve member, means securing a portion of each sealing member to said seat, means securing another portion of each sealing member to said valve member, a valve member operator slidably carried by each cage, means connecting said operator to said valve member, a pair of heads engaging the opposite ends of said body, each head including a flange having a diameter greater than the outer diameter of said body, bolts engaging through said flanges outwardly of said body for holding said heads against the ends of said body, a cam shaft journaled through one of said heads, a reduced inner end carried by said shaft, an inner bearing carried by the other head for said reduced inner end of said cam shaft, and a cam fixed on said shaft for engagement with a selected operator to thereby move a selected valve member to open position.

11. A multiple valve assembly comprising a cylindrical body formed with a plurality of radially arranged openings, cylindrical sleeves tightly fitting in said openings and projecting interiorly and exteriorly of said body, outer sleeves tightly fitting about the outer portions of said first sleeves, an inner shoulder carried by each outer sleeve, a valve cage seated on said shoulder, a valve seat carried by said cage, a rockable valve member carried by said cage and disposed coplanar with said seat when in closed position, flexible sealing members engaging the opposite sides of said seat and said valve member, means securing a portion of each sealing member to said seat, means securing another portion of each sealing member to said valve member, a valve member operator slidably carried by each cage, means connecting said operator to said valve member, a pair of heads engaging the opposite ends of said body, each head including a flange having a diameter greater than the outer diameter of said body, bolts engaging through said flanges outwardly of said body for holding said heads against the ends of said body, a cam shaft journaled through one of said heads, a reduced inner end carried by said shaft, an inner bearing carried by the other head for said reduced inner end of said cam shaft, a cam fixed on said shaft for engagement with a selected operator to thereby move a selected valve member to open position, and spring-pressed means normally holding said shaft against rotation.

12. In a multiple valve assembly, a valve housing including a hollow body, a pair of head members at the ends of said body, means exteriorly of said body securing said heads to said body, radially arranged valve structures carried by said body, a cam shaft journaled through one of said heads, an inner cam shaft bearing carried by the other head, a cam on said shaft, means securing said cam on said shaft, an index plate on said shaft adjacent the inner side of said one head, outwardly facing sockets formed in said plate, inwardly facing sockets formed in said one head confronting the sockets in said plate, balls in said sockets, an elongated pin extending through said shaft, inwardly extending lugs struck from said plate and engaging on opposite sides of said pin, means carried by said plate for holding said pin against endwise movement, a cup-shaped plate presser member on said shaft formed with slots through which said pin is adapted to loosely engage, and a spring about said shaft between said cam and said presser member for constantly urging said index plate outwardly and yieldably holding said shaft against rotation.

GEORGE T. DOWNEY.